United States Patent [19]

Olson

[11] Patent Number: 5,247,617
[45] Date of Patent: Sep. 21, 1993

[54] METHOD FOR SUPPLYING DATA TO A BUFFERED UART

[75] Inventor: Gene H. Olson, Minneapolis, Minn.

[73] Assignee: Digi International, Inc., Eden Prairie, Minn.

[21] Appl. No.: 661,987

[22] Filed: Feb. 26, 1991

[51] Int. Cl.5 ............................. G06F 5/00; G06F 5/06
[52] U.S. Cl. .................................................... 395/250
[58] Field of Search ................ 395/250; 364/200, 900

[56] References Cited

U.S. PATENT DOCUMENTS 4,159,532  6/1979  Getson, Jr. et al. ................ 395/275
4,598,363  7/1986  Clark et al. .......................... 395/250
4,829,421  5/1989  Ritchie ................................ 395/250
5,072,420  12/1991 Conley et al. ....................... 395/425

Primary Examiner—Dale M. Shaw
Assistant Examiner—D. Dinh
Attorney, Agent, or Firm—Faegre & Benson

[57] ABSTRACT

This invention is an improved method for transmit polling of buffered UARTs. For each polling interval, the method predicts the minimum number of characters needed to keep the transmitter from going idle before the next polling interval and places exactly that many characters in the transmit fifo.

20 Claims, 1 Drawing Sheet

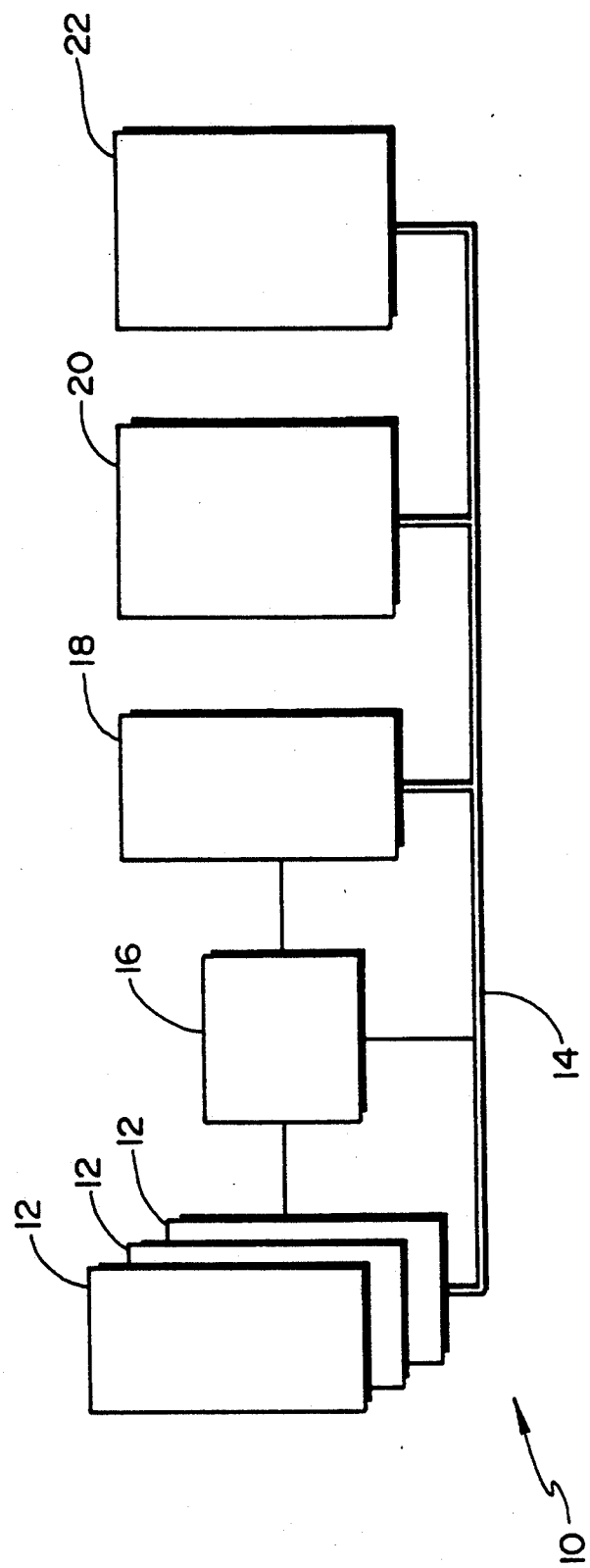

METHOD FOR SUPPLYING DATA TO A BUFFERED UART

BACKGROUND OF THE INVENTION

A wide variety of asynchronous communication devices are conventionally connected to computer systems. Generally, this has been done using an integrated chip device known as a UART, an acronym for Universal Asynchronous Receiver Transmitter.

Over time, UARTs have appeared in three functional types, namely unbuffered UARTs, buffered UARTs, and DMA UARTs, the strengths and weaknesses of which for use in high speed communication are discussed below.

1. Unbuffered UARTS. (example 16450)

To send a character the processor stores it in a chip holding register. When a shift register becomes empty, the character is moved from the holding register to the shift register. The character is then shifted and transmitted a bit at a time until it is completely transmitted. By the time transmission is complete—to maintain full speed operation—the processor must have stored another character into the holding register so it can be immediately moved to the shift register and transmitted.

On receive, the chip shifts data a bit at a time into the receive shift register. When a complete character has been received, the character is then moved to a holding register where the processor can read it. If more incoming data is present, the shift register then proceeds to shift in that data, and overwrites the previous character. If the processor hasn't read that character, the data is lost.

The problem with this type of UART is that it requires the processor to service the asynchronous line at the character rate. Most often there are 10 bits/character, so if a line runs at 9600 baud, the host must service the UART 960 times/second.

2. Buffered UARTs

These UARTS improve the above design by replacing the holding register with a FIFO (First-in-First-out) buffer to depth 4-32 bytes. In such a design with 16 byte receive and transmit UARTs, the processor only needs to service the chip every 16 characters, greatly reducing overhead.

3. DMA UARTs

These UARTs improve both the above designs by providing on-chip DMA circuitry to transfer incoming and outgoing data directly to processor memory without interaction from the processor.

This type of UART provides extremely high performance with low processor overhead, but is much more expensive in hardware. The chip must be provided with full bus access circuitry, and the memory subsystem must allow DMA access. For this reason, such chips are generally much more expensive.

SUMMARY OF THE INVENTION

The present invention provides a method of optimizing the performance of the buffered UARTs so that they can approach the performance of the more expensive DMA UARTs.

The present invention is an improved technique for transmit polling of buffered UARTs. Each polling interval, this technique predicts the minimum number of characters needed to keep the transmitter from going idle before the next polling interval. It then places exactly that many characters in the transmit fifo.

DETAILED DESCRIPTION OF THE INVENTION

The present invention is specifically described below in connection with a 16550 UART but the invention is generally applicable to any system for predicting the number of characters that need to be placed in a transmit fifo to maintain a particular data rate. The invention, as discussed more fully below is applicable to all devices which transmit at a predetermined speed and are serviced at precisely scheduled intervals.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a block diagram of the operative portions of a multiple channel communications device 10 which, in the preferred embodiment disclosed utilizes a plurality of UARTs 12 having integral First In First Out input buffers. Each of the UARTs 12 communicates with address and data control bus 14 and receives timing signals from clock 16 which also drives periodic timer 18 that schedules the start of service or polling intervals under the control of microprocessor 20. System memory 22 is also in communication with bus 14 to deliver or receive characters to or from serial communication chips 12.

In order to fully disclose the present invention it is necessary to consider the two modes of operation conventionally used with buffered fifo UARTs, namely Interrupt mode and Polling Mode.

Interrupt Mode

Well designed systems using this mode use the FIFOs to reduce the number of host processor interrupts, and to reduce processor latency requirements.

To transmit data, the processor is interrupted when the number of characters in the output FIFO falls below a certain number (usually 1-3) so the processor can fill the FIFO again before it runs dry. If the FIFO can hold 16 characters, and the processor is interrupted when only two are left, this means the processor is interrupted only once every 14-16 transmit characters. Also if running at a typical speed of 9600 baud, sending a character about every millisecond, the processor need not respond to an interrupt more quickly than 2 milliseconds to keep continuously transmitting data.

To receive data, the processor is interrupted when the number of characters in the receive FIFO climbs above a receive interrupt trigger level. If the FIFO can hold 16 characters, and the interrupt trigger level is set to 8 characters, and data is received continuously, the processor is interrupted only every 8-16 characters. In addition, the processor always has at least 8 character times to respond to an interrupt before the FIFO overflows and the data is lost.

Buffered UARTs generally provide an additional receive interrupt to assure that a number of characters below the interrupt trigger level cannot remain in the buffer for an extended period of time. This interrupt occurs when there is at least one character in the receive fifo and no additional characters are received during a timeout period. Such a time period is generally specified as some number of character times—often four—at the current receive baud rate.

Advantages to using Interrupts are as follows:

1. There is no overhead unless data is being received or transmitted.

Disadvantages to Interrupts

1. Although buffered UARTs greatly reduce interrupt overhead, they do not eliminate it, and interrupt overhead is fairly expensive.

2. Most UARTs do not provide for flexible selection of the receive data timeout. Typically the number is specified as a number of receive characters at the current baud rate. This is a reasonable number when the baud rate is high, but is much too long when the baud rate is 300 baud or below. A typical value of 4 character times at 110 baud adds a keystroke echo delay of 400 milliseconds. This is extremely irritating to most typists.

3. In most UARTs, the transmitter does not pause immediately when a flow control output stop request is received. If the output FIFO contains 16 characters, all 16 characters must be transmitted before output will stop. At 110 baud, this can be a delay of over a second. When this delay is combined with the inherent delay in 2 above, the time to respond to a received XOFF can be even longer.

Polling

It is less common to do polling of buffered UARTs. In this mode the processor services the UARTs at regular fixed intervals.

To transmit data, the processor "tops off" the transmit FIFO each service period, so that the FIFO will continue to feed the shift register until the next service interval. If full speed transmission is to be maintained, the longest service interval must be less than the time needed to transmit the number of characters in the FIFO.

To receive data, the processor drains the receive FIFO each service period, so that the FIFO never overflows between service periods. To avoid data loss, the longest service interval must be less than the time needed to fill the FIFO.

Interrupt/Polling Combinations

In the prior art, various interrupt/polling combinations have been used. One classic example is the technique of servicing the receive fifo every clock tick and also every time the receive trigger level is hit. This way a guaranteed minimum time for keystroke response is guaranteed by the clock tick, while input overrun is avoided using the receive interrupt.

The Preferred Embodiment of the Present Invention

The present invention is an improved technique for transmit polling of buffered UARTs 12. Each polling interval, this technique predicts the minimum number of characters needed from system memory 22 to keep the transmitter of chip 12 from going idle before the next polling interval. It then places exactly that many characters in the transmit fifo of chip or UART 12.

The number of characters needed can be precisely calculated because UART transmitter 12 is a determin-istic device that transmits at a speed controlled only by two parameters: The transmit baud rate and the bit-width of each character transmitted. For example at 9600 baud a 10-bit character (including start and stop bits) takes exactly:

$$\frac{10(\text{bits/character})}{9600(\text{bits/second})} = \frac{1}{960} \text{ (seconds/character)}$$

In the preferred embodiment, we wish to poll a collection of 16-byte buffered UARTs fast enough to send and receive data full speed at 57600 baud without pauses or data loss. The following describes an actual embodiment of the invention where this was achieved.

UARTs 12 are fed by a 1.8432 MHz clock 16 which is divided down internally by 16, so that the baud rate generator value placed in each UART 12 to achieve the desired bit rate is:

$$\frac{115200}{(\text{selected baud rate})} = (\text{baud rate generator value})$$

This makes the time, in seconds, needed to transmit each character equal to a new variable, designated CTT which may be defined as:

$$\frac{(\text{baud rate generator value})*(\text{number of bits/character})}{115200}$$

A clock output from this same 1.8432 MHz clock 12 is fed into periodic timer 18 that schedules the start of each polling interval. Timer 18 is loaded with an internal value of 3952, so that time interrupts are provided to processor 20 at intervals, defined as the variable PT or Polling Time, of:

$$\frac{3952}{1843200} = \frac{247}{115200} \text{ seconds} = 2.144 \text{ milliseconds}$$

Thus the Poll Time PT and the Character Transmit time CTT are both expressed in the same dimensional units of (seconds/115200), and are both exact, since they are generated from the same clock 16. They are specified with integer values and created from the same clock signal in order to simply the operations carried out in executing the alorithm set forth below.

The following algorithm is executed during each poll Time to supply UART transmitter 12 with the minimum number of characters needed to remain busy until the next poll interval. After each execution of the algorithm, the variable RESIDUAL denotes the number of 1/115200 second units transmitter 12 will remain busy after next poll interval before it can begin transmitting a character provided that interval. Internally RESIDUAL is represented as a 16-bit signed integer quantity originally initialized to zero.

RESIDUAL = RESIDUAL − PT
while (data to transmit) and (RESIDUAL (0)
   Feed the transmitter another character
   RESIDUAL = RESIDUAL + CTT
If (RESIDUAL < 0) RESIDUAL = 0

The rationale is as follows

1. During each interval having a duration, PT, of 247 time units, RESIDUAL is decremented by PT, the time that will expire before the beginning of the next poll interval.

2. While there is data waiting to be transmitted and RESIDUAL is negative (indicating that the transmitter will go idle before the beginning of the next poll interval) put another character into the UART, and increment RESIDUAL by the time it will take for that character to be transmitted.

3. If there isn't enough waiting data to keep the transmitter busy until the next interval, the RESIDUAL transmit time on the next poll is zero.

It should be understood that the above algorithm provides the minimum number of characters to UART transmitter 12 each interval so that the transmitter remains continually busy.

While for our purposes the long-term accuracy of the polling timer 18 is exact, there is unavoidable jitter on the individual polling times due to complex interactions with other code in processor 20. The worst case jitter that can be tolerated before the transmit data buffer overflows occurs at 57,600 baud (where the baud rate generator value is 2) with 9 bit characters. In this case we put 14 characters in the transmit buffer of UART 12 when we believe RESIDUAL is 12. If we are early by 6 time units, there can be 2 characters in the buffer. If we are early by 6+18=24 units, there can be 3 characters in the buffer. Adding 14 additional bytes would then overrun the 16 byte fifo. Hence we can tolerate a maximum jitter of 24 units, equal to 24/115200 seconds or 200 microseconds.

This same jitter tolerance applies to the receive fifo, but the analysis is different. The worst case occurs at the same baud rate and character width when the receive poll routine just misses an incoming character and leaves it in the buffer as it exits the routine. If the poller returns 15 character times plus 1 bit time later, the 16 byte fifo overflows and the first bit of the 17th character is lost. Thus, the time to receive 15 characters plus 1 bit time is 15 * 2 * 9+1=271 units. Normally the poller comes in every 247 units, so the maximum jitter is again 271−247=24 units.

This technique has three advantages over the standard transmit polling technique of topping off the transmit fifo each polling interval:

1. It can be used with UARTs such as the 16550 which provides limited information about the status of the transmit UART. That UART only indicates when (1) The transmitter shift register is empty or (2) the transmitter fifo is empty (there may still be a character in the transmitter shift register). This UART provides no status information to enable a program to "top off" the transmit fifo.

2. It stops transmission faster than a conventional polling technique in response to a received XOFF, because the transmitter always contains the minimum number of characters needed to remain busy at the given polling rate.

3. It is faster when polling because the inner loop can be done with an integer subtract and test for negative. This is considerably faster than polling the UART to see if it is ready for another character.

It should be obvious to one skilled in the art that the above description can be generalized to any system that predicts the number of characters that need to be placed in a transmit fifo to maintain a given data rate. This applies to all devices known to transmit at a predetermined speed and serviced at precisely scheduled intervals.

It should also be obvious that the time standard at which the fifo device is polled need not be precisely locked to the baud rate generator of the device. However where different time standards are used, there must be a provision for drift between the time standards. In the case of a UART transmitter described above, this could be done by transmitting at a slightly lower rate, just enough to account for the sum of the tolerances of the two time standards.

The invention is not to be taken as limited to all of the details thereof as modifications and variations thereof may be made without departing from the spirit or scope of the invention.

What is claimed is:

1. A method for supplying data from a computer system to a peripheral device, the peripheral device having a first in first out storage buffer which receives data from the computer system and outputs data to a transmitter which then transmits the data at a predetermined speed, the method comprising the steps of:
    a) polling the peripheral device at regular transmit polling intervals;
    b) predicting during each polling interval some number of characters necessary to prevent the transmitter from going idle before a next transmit polling interval by modelling the transmission of data by the peripheral device; and
    c) supplying during each polling interval no more than the predicted number of characters from the computer system to the storage buffer.

2. The method according to claim 1, wherein step b) is further comprised of the following steps:
    i) decreasing a residual variable by an amount equivalent to the time that will expire before the next transmit polling interval, the residual variable being initially intialized to zero;
    ii) loading a character into the storage buffer for transmission if the residual variable is negative;
    iii) incrementing the residual variable by the time that will be required for transmission of the character at the predetermined speed if the character is loaded; and
    iv) assuring that the residual variable is reset to zero when there are not enough characters ready to keep the transmitter busy until the next transmit polling interval.

3. The method of claim 1, wherein the predicting step b) predicts a minimum number of characters necessary to prevent the transmitter from going idle between transmit polling intervals.

4. The method of claim 1 or 2, wherein the regular transmit polling intervals are at fixed intervals.

5. The method of claim 1 wherein the transmitter operates at a constant speed.

6. A system for transmitting data from a computer system comprising:
    a) a peripheral device having
        i) a first in first out storage buffer having a buffer input receiving data from the computer system and a buffer output, and
        ii) a transmitter receiving data through an input connected to the buffer output and transmitting data at a predetermined speed;
    b) polling means for polling the peripheral device at regular transmit polling intervals;
    c) predicting means for predicting during each transmit polling interval some number of characters necessary to prevent the transmitter from going idle before a next transmit polling interval by modelling the transmission of data by the peripheral device; and d) supplying means for supplying no more than the predicted number of characters to the storage buffer from the computer system.

7. The system according to claim 6, wherein the predicting means further comprises:
   a) means for decreasing a residual variable by an amount equivalent to the time that will expire before the next transmit polling interval, the residual variable being initially initialized to zero;
   b) means for loading a character into the storage buffer for transmission if the residual variable is negative;
   c) means for incrementing the residual variable by the time that will be required for transmission of the character at the predetermined speed if the character is loaded; and
   d) means for assuring that the residual variable is reset to zero when there are not enough characters ready to keep the transmitter busy until the next transmit polling interval.

8. The system of claim 6 or 7, wherein the peripheral device comprises a serial communication chip.

9. The system of claim 6 or 7, wherein the peripheral device comprises a buffered Universal Asynchronous Receiver Transmitter (UART).

10. The system of claim 6 or 7, wherein the peripheral is controlled by a first clock source and the transmit polling interval is timed by a second clock source and the two clock sources are operated in synchronism.

11. The system of claim 10 wherein the first and second clock sources are the same clock.

12. A method for transmitting data from a computer system through a peripheral device having a first in first out storage buffer and a transmitter which transmits the data in the storage buffer at a determinable speed, the method comprising the steps of:
   a) polling the peripheral device at determinable transmit polling intervals;
   b) predicting during each transmit polling interval a minimum number of characters necessary to prevent the storage buffer from becoming empty before a next transmit polling interval by modelling the transmission of data by the peripheral device;
   c) supplying during each transmit polling interval no more than the predicted minimum number of characters from the computer system to the storage buffer; and
   d) transmitting the characters from the transmitter.

13. The method according to claim 12, wherein the step of predicting the minimum number of characters is further comprised of the following steps:
   i) determining a current residual time, the current residual time being an amount of time remaining before the storage buffer becomes empty;
   ii) determining a poll time, the poll time being an amount of time before the next transmit polling interval;
   iii) determining a character transmit time, the character transmit time indicating an amount of time required to transmit a character at the determinable speed of the transmitter;
   iv) setting a predictive residual time by subtracting the poll time from the current residual time;
   v) increasing the number of characters predicted by one and increasing the predictive residual time by the character transmit time for as long as the predictive residual time is negative.

14. The method according to claim 13, further comprising:
   vi) setting the predictive residual time to zero when there no more characters to be transmitted by the computer system and the predictive residual time is still negative.

15. The method according to claim 14, wherein the step of determining the current residual time further comprises using a previous predictive residual time from an immediately previous transmit polling interval as the current residual time.

16. The method according to claim 15, wherein the step c) of supplying no more than the predicted number of characters comprises loading a single character into the storage buffer each time the predictive residual time is increased by the character transmit time.

17. The method according to claim 16, wherein the poll time is constant.

18. The method according to claim 17, wherein the character transmit time is constant.

19. The system of claim 6 or 7, wherein the regular transmit polling intervals are at fixed intervals.

20. The system of claim 6, wherein the predicting means predicts a minimum number of characters necessary to prevent the transmitter from going idle before the next transmit polling interval.

* * * * *